March 6, 1951 K. H. HACHMUTH 2,544,224

CIRCULAR SLIDE RULE

Filed Dec. 28, 1948 2 Sheets-Sheet 1

INVENTOR.
K. H. HACHMUTH
BY Hudson & Young
ATTORNEYS

March 6, 1951 | K. H. HACHMUTH | 2,544,224

CIRCULAR SLIDE RULE

Filed Dec. 28, 1948 | 2 Sheets-Sheet 2

INVENTOR.
K. H. HACHMUTH
BY Hudson & Young
ATTORNEYS

Patented Mar. 6, 1951 2,544,224

UNITED STATES PATENT OFFICE 2,544,224

CIRCULAR SLIDE RULE

Karl H. Hachmuth, Bartlesville, Okla., assignor to Phillips Petroleum Company, a corporation of Delaware Application December 28, 1948, Serial No. 67,614

12 Claims. (Cl. 235—84)

This invention relates to a calculating device of the slide rule type. In one of its more specific aspects it relates to a calculating device of the slide rule type for use in solving equations relating to equilibrium between two phases in multi-component systems. In a still more specific aspect it relates to a slide rule for use in solving equations relating to equilibrium vaporization or condensation of multi-component mixtures, especially of hydrocarbons.

One object of my invention is to provide a calculator for use in solving equations relating to equilibrium between liquid and vapor phases, two liquid phases, liquid and solid phases, etc., in multicomponent systems. Another object of my invention is to provide a calculator for solving equations relating to equilibrium vaporization of multi-component mixtures, especially of hydrocarbons.

Still another object of my invention is to provide a calculator for solving equations relating to equilibrium condensation of multi-component mixtures, especially of hydrocarbons.

Still another object of my invention is to provide a calculator for assisting in the solving of equations relating to equilibrium vaporization and equilibrium condensation of multi-component mixtures of hydrocarbons or other volatile chemical compounds wherein no one of the components reacts chemically with another component under the conditions of said equilibrium.

Yet another object of my invention is to provide a calculator for assisting in the rapid solving of equilibrium equations of the above mentioned nature wherein trial and error methods are involved.

Other objects and advantages will be apparent to those skilled in the art upon reading the following description which taken in conjunction with the attached drawing forms a part of this specification.

In the drawing

Figure 1:
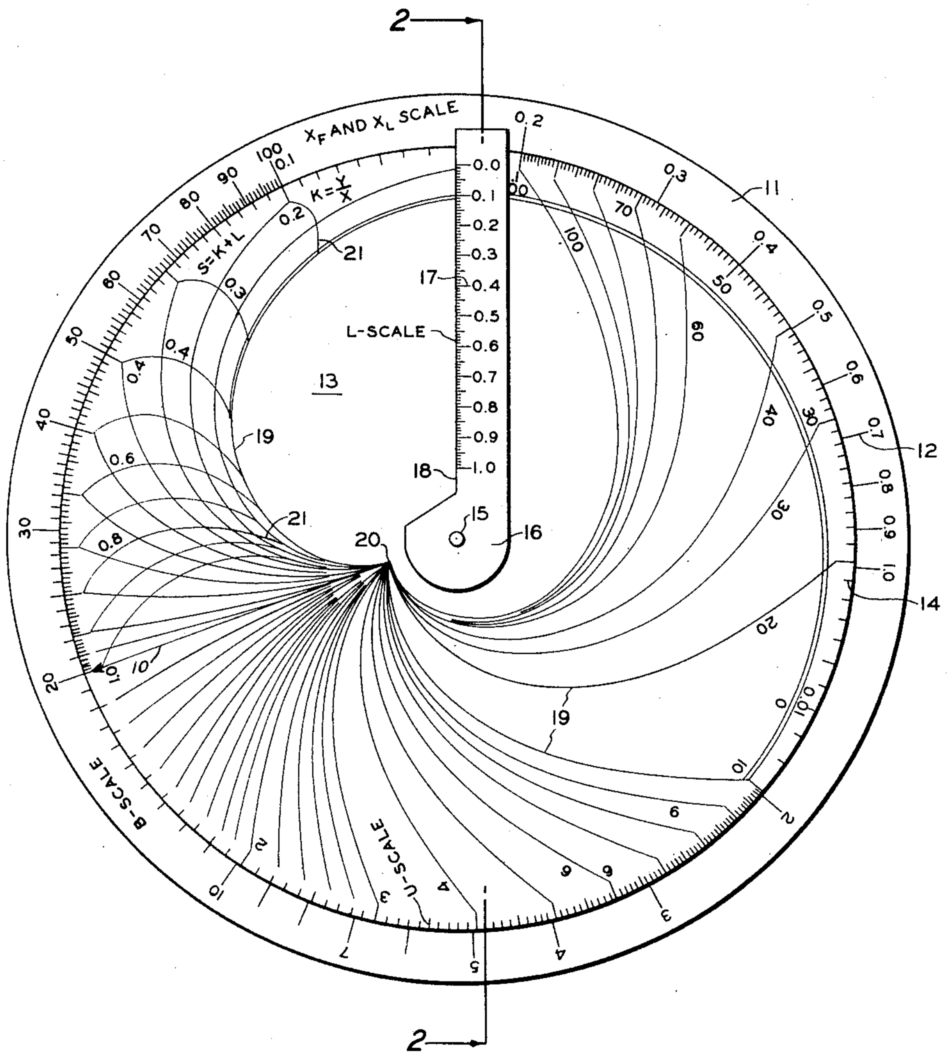
Figure 1 is a plan view of a preferred form of calculator of my invention.
Figure 2:
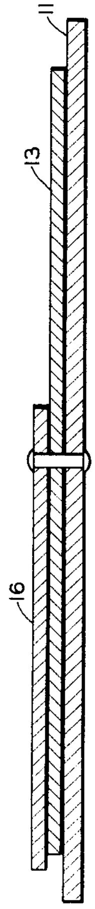
Figure 2 is a cross-sectional view of the preferred form of calculator taken along the line 2—2 of Figure 1.

Referring to the drawing and specifically to Figure 1, numeral 11 refers to a lower and larger circular disk on the periphery of which is marked a logarithmic scale 12. On top of this disk is disposed another circular disk 13 having a logarithmic scale 14 marked along its periphery. Disk 13 is of smaller diameter than disk 11. The logarithmic scale 14 is so marked on the disk 13 that any point on this scale may be positioned adjacent any desired point on the peripheral scale 12 on the disk 11. The disks 11 and 13 are pivoted at pivot point 15 in such a manner that one disk may be rotated with respect to the other. The pivot is preferably centrally located so that the circular disks are concentric.

On top of the disk 13 is an indicator or scale arm 16 which is also pivoted at point 15. A scale 17 is marked along the radial edge 18 of the arm 16, and this edge 18 if extended would pass through the center or pivot point of the disks 11 and 13. The outer end of this indicator 16 may terminate as a point or as a square end as illustrated in the drawing. While the scale on this indicator terminates some distance short of scale 12, the arm extends such a distance beyond this scale that the indicator may be used to indicate points on this scale.

In a preferred embodiment the scales 12 and 14 are logarithmic scales from 0.1 or less to 100, the scales being arranged in reverse order with respect to each other.

Some curved lines 19 converging at a common point 20 extend to points on scale 14. These curves are functions of equilibrium vaporization constants K. The equilibrium constant K is the ratio of the mol fraction of a component in the vapor phase to its mol fraction in the liquid phase under equilibrium conditions at a given temperature and pressure. This constant K and its significance are well known in the art.

In a more general case, i. e., not limited to equilibrium between a liquid and its vapor, these curves 19 are functions of an equilibrium constant defined as the ratio of the mol fraction of a component in a first phase to the mol fraction of that component in a second phase, assuming that a condition of equilibrium had been reached at given conditions of temperature and pressure.

The polar coordinate equation for the curves 19 (hereinafter called the K-lines) is $$\theta=\frac{360}{C}\log_{10}\left[1+\frac{k(r-a)}{b}\right]$$

in which $\theta$=degrees (using $K$=1.0 line as zero degrees); $a$=distance between the center or origin and the point of convergence of the "K" lines. This "$a$" value also determines the location of the "$L$=1.0" point on the L-scale 17 of indicator 16; $b$ is the length of scale 17; $k=(K-1)$, in which K is the equilibrium constant; $r$ is the distance from the center; C is the number of logarithmic cycles around the edge of the disk 13, which in this case is 3. The equation may be simplified by letting $a=0$, thereby putting the point 20 and the value $L=1$, at the center of the disks, and by letting $b=1$. Expressing $\theta$ in radians, this K curve equation then has the form $$\theta=\frac{2\pi}{C}\log_{10}(1+kr)$$

The K-curves may be laid out by making a series of concentric circles, with their centers at the center of the disk 13 and with radii corresponding to the graduations on the indicator arm 16. The intersection of a radius (drawn from a graduation at the edge of disk 13 found from the function, $K-LK+L$=value of graduation) and a circle which represents the L value used in the function determines a point on the K curve whose K value is the same as used in the function. The terminals of the K value lines are divisions and subdivisions on a logarithmic (counterblockwise) scale 14. For convenience, it is preferable to make the scale continuous, i. e., the 100 division identical with the 0.1 division on the 3-cycle circular scale 14.

The circular scale 12 on disk 11 is also a 3-cycle logarithmic scale and is disposed clockwise around disk 11.

USE OF CIRCULAR SLIDE RULE

This slide rule was designed to assist in the solution of equilibrium condensation or vaporization problems, but it may be used for other purposes as well.

To simplify discussion, the logarithmic scale 12 on disk 11 is termed the B-scale, the logarithmic scale 14 on the disk 13 is termed the U-scale while the scale 17 on the indicator or slide 16 is called the L-scale.

*Multiplication*

To multiply 2×4, set 2 on the U-scale opposite the numeral 4 on the B-scale and read the answer 8 on the B-scale opposite "1.0" on the U-scale. For convenience, the graduation marked "1.0" may terminate as a pointer or carry an arrow head for easy identification.

*Division*

To divide 5 by 2, set the arrow on the U-scale opposite 5 on the B-scale and read the answer 2.5 on the B-scale opposite the divisor 2 on the U-scale.

For numbers larger than 100 or smaller than 0.1, the continuous scales B and U may be used. Although not so marked on the drawing, each division corresponds to a series of numbers, 1000 fold apart from each other, for example, the division marked 2 simultaneously represents 0.000002, 0.002, 2, 2000, 2,000,000, and so on. Hence any size number may be divided or multiplied on this device providing due regard is given to the proper positioning of the decimal point in the quotient or product.

*Flash vaporization or condensation*

If a feed stream of known composition is supplied to a flash vaporization chamber operating at a known temperature and pressure, the compositions of the resulting vapor and/or liquid streams can be calculated from the equation:

$$(1)\quad \frac{X_{ac}}{1+V(K_a-1)}+\frac{X_{bc}}{1+V(K_b-1)}+\frac{X_{cc}}{1+V(K_c-1)}+\cdots=100$$

in which $X_{ac}$, $X_{bc}$, $X_{cc}$, etc., are the concentrations in mol per cent of components $a$, $b$, $c$, etc. in the feed stream, $K_a$, $K_b$, $K_c$, etc. are the respective vaporization equilibrium constants of components $a$, $b$, $c$, etc., at the temperature and pressure of the vaporization chamber, and V is the mol per cent of the feed which is vaporized or remains as vapor, i. e., which leaves the chamber in the vapor phase.

For any given component, the following relation holds:

$$(2)\quad \frac{X_c}{1+V(K-1)}=X_L$$

in which $X_L$ is the mol per cent of said component leaving the vaporization chamber in the liquid phase. Since the composition of the feed stream and the conditions of temperature and pressure are known, the values $X_c$ and K are known for each component. By substituting in Equation 2 these known values $X_c$ and K, and an assumed or estimated value of V, one can solve the equation for $X_L$. When this calculation has been made for all the components of the feed stream, the values of $X_L$ are added. If the sum is greater or less than 100 a different value of V must be assumed. These calculations are repeated until the proper value of V is found, i. e. until Equation 1 is satisfied. It is obvious that such calculations are time consuming and tedious if they are carried out in the manner just described, that is by substituting in Equation 2 and solving algebraically for $X_L$. The present invention, however, provides a simple and rapid method of solving for $X_L$, thereby reducing to a minimum the time required for solution of Equation 1. Using the circular slide rule of this invention as it is illustrated in Figure 1, i. e., when the scale 17 is graduated in terms of mol fraction of the feed which remains as liquid (L) rather than in terms of vapor (V), it is first necessary to convert the assumed value of V to an equivalent value in terms of L. This is readily accomplished from the relationship $V+L=100$ (mol percent) or $V+L=1$ (mol fraction).

The logarithmic scale 12 (B-scale) on the larger disks 11 represents values of $X_c$ or values of $X_L$, the concentration in mol fraction or in mol per cent of a given component in the charge ($X_c$) or in the liquid phase ($X_L$).

The calculation of $X_L$ is then carried out by setting the arrowed line 10 of the U-scale opposite the known value of $X_c$ on the B-scale, moving the scale arm 16 until the value of L equivalent to the "assumed" value of V coincides with the known value of K, and reading the answer $X_L$ from the B-scale at the point where it is intersected by the edge of the indicator 16. If, for example, $X_c$ is 18.2, and L is assumed to be .30, with K as 5, $X_L$ is found to be 4.79. A similar calculation is carried out for each component, substituting the known values of $X_c$, and K, and using the same assumed value of $L$=.30, until the $X_L$ values for all the components are found. As explained above, if the sum of the calculated $X_L$ values is 100, then the assumed value of L is the correct value and the composition of the liquid leaving the vaporization chamber is given by the values of $X_L$. If the sum of the several $X_L$ values is less than or is greater than 100, then a different value for L is assumed and the calculations repeated. This procedure is repeated until an L value is found which yields $X_L$ values, the sum of which equals 100, or in other words satisfies Equation 1.

*Test for dew point of a mixture*

A mixture of the following composition and at conditions of temperature and pressure are such that the equilibrium vaporization constants (K values) are as given below; to determine whether the mixture is above, below or at its dew point:

COMPOSITION

| Component | Mol Percent $X_c$ | K |
|---|---|---|
| A | 40 | 10 |
| B | 30 | 5 |
| C | 5 | 1.1 |
| D | 19 | .5 |
| E | 6 | .1 |
| | 100 | |

Divide on the slide rule each $X_c$ by its corresponding K as described above for simple division. These quotients are as follows:

| Component | $X_c/K$ |
|---|---|
| A | 4.0 |
| B | 6.0 |
| C | 4.5 |
| D | 38.0 |
| E | 60.0 |
| Sum | 112.5 |

if the sum of the $X_c/K$ values is less than 100 the mixture is above its dew point, that is, it is all vapor; if it equals 100, the mixture is at its dew point while if it is greater than 100 the mixture is below its dew point, that is, it is partially or completely condensed. In the above calculations, the sum of the $X_c/K$ values was 112.5, thus at least some liquid was present under the pressure and temperature conditions used to determine the K values.

*Test for boiling point of a mixture*

Using the same $X_c$ and K values as given in the dew point calculation, multiply each $X_c$ value by the corresponding K value to produce $X_cK$ products, as follows:

| Component | $X_cK$ |
|---|---|
| A | 400 |
| B | 150 |
| C | 5.5 |
| D | 9.5 |
| E | .6 |
| | 565.6 |

If the sum of the calculated $X_cK$ values is greater than 100 the mixture is above its boiling point and partly or entirely vaporized; if the sum of these calculated values equals 100, the mixture is at its boiling point while if the sum of these calculated values is less than 100, the mixture is below its boiling point. In this example, the $X_cK$ value for component A was greater than 100 therefore it was unnecessary to carry out the multiplications for the other components. In this example since the mixture is above its boiling point it is evident that the mixture is present as all vapor or part vapor and part liquid.

*To find fraction of mixture existing as liquid*

Using the same mixture composition and K values as used above in the dew point and boiling point calculations, the mol fraction of the mixture existing as liquid is found as follows:

| Component | Mol Per Cent | K | Calculated $X_L$ Values for Assumed L Values | | |
|---|---|---|---|---|---|
| | | | Trial No. 1 (for L=.3) | Trial No. 2 (for L=.1) | Trial No. 3 (for L=.02) |
| A | 40 | 10 | 5.5 | 4.4 | 4.07 |
| B | 30 | 5 | 7.9 | 6.5 | 6.1 |
| C | 5 | 1.1 | 4.7 | 4.6 | 4.55 |
| D | 19 | .5 | 29.5 | 34.7 | 37.4 |
| E | 6 | .1 | 16.2 | 31.2 | 48.5 |
| | | | 63.8 | 82.4 | 100.62 |

The above tabulated trial 1, trial 2, etc., calculations were obtained as follows:

Assume some mol fraction of the mixture to exist as liquid, for example 0.3. Set pointer (1.0 on U-scale) opposite 40 on B-scale, move indicator until the 0.3 division on the L-scale exactly intersects the K-curve labeled 10, and read 5.5 on the B-scale and record this value in the trial No. 1 column for component A. For component B, set pointer on U-scale opposite 30 on B-scale, rotate indicator 16 until .30 on L-scale coincides with the K-curve marked 5, read 7.9 on the B-scale and enter in the trial-1 column for component B. For component C, set pointer of U-scale opposite 5 on B-scale, rotate slide until .30 on L-scale coincides with the K-line marked 1.1, read 4.7 on the B-scale and enter in its proper space in the trial-1 column. Upon carrying out the corresponding calculations for components D and E the values 29.5 and 16.2, respectively, are found and are recorded in their proper spaces in the trial No. 1 column. Upon adding the calculated $X_L$ values in trial No. 1 column, the sum is 63.8, and since this sum is not 100, another value of L must be assumed and similar calculations made.

For the second trial, assume a value of 0.1 for L, and make calculations similar to those just described, but using the 0.1 division on the L-scale to coincide with the respective K-curves. Results of this trial are recorded in the "trial No. 2" column. The values in this column total 82.4.

For a third trial, assume a value of 0.02 for L, and make calculations similar to those just made, excepting use the value 0.02 on the L-scale. These calculated values total 100.62.

For many purposes this total of 100.62 may be sufficiently near 100. However, the sum of $X_L$ values was not exactly 100 and therefore the mol fraction of liquid was not exactly 0.02.

Because the K-curves approach parallelism with the periphery of the B-scale at low K values, the position at which a given value on the L-scale matches a chosen K value becomes difficult to determine. Assuming the intersection of the L-scale with the chosen K-curve may be in error by as much as ±0.01 the possible variation in reading the $X_L$ value for components D and E is given in the third column of the following table:

| Component | $X_L$ for L=0.02 | Possible variation in $X_L$ with slight errors in setting slide rule when using K-curves | Possible variation in $X_L$ using S-curves |
|---|---|---|---|
| A | 4.07 | | |
| B | 6.1 | | |
| C | 4.55 | | |
| D | 37.4 | 37.0–37.7 | 37.1–37.7 |
| E | 48.5 | 45.0–52.7 | 48.1–48.9 |

These variations represent only ±one per cent in the fraction remaining liquid but such large errors in the composition of the residual liquid are annoying. A much higher degree of precision may be obtained by using a different set of curves drawn on disk 13 in place of the low value K-curves and designated as "S-curves" 21. The possible variation when using the S-curves is given in the fourth column in the above table. For component D, when using the S-curve, the error in setting is about the same as when using the K=0.5 curve. For component E, when using the S-curve the error in setting is only about one tenth that found when using the K=0.1 curve. When K-values are less than 0.5, the S-curves may be used to increase accuracy of calculations involving K values.

The S-values are the sum of the K values and the fraction L remaining as liquid, as represented by the equation $S=K+L$. By the nature of the S-curves the numerical value of L and the corresponding value of K both lie along the straight line of the L scale. For example, in $S=K+L$, if S is .7, as far as $S=.7$ is concerned it is immaterial whether L is .1 or .6, or whether K is .6 or .1; when $L=.6$ is set on the $S=.7$ curve, this setting is slightly difficult since the S=.7 curve is not far from parallel to the L-scale at this point. The $S=.7$ curve intersects the L-scale at another point, viz. at the point 0.1, and at this point of intersection the $S=.7$ curve is less nearly parallel to the L-scale than it is at the $L=.6$ point, hence a more accurate reading on the B-scale may be made in this case if the value 0.1 on the L-scale is used to determine the positioning of the L-scale than if the point $L=.6$ on the L-scale is used. Thus the smaller value of K or L should be used on the L-scale to be able to determine more accurately its setting with respect to the S-curve. The smaller numbers on the L-scale are nearer the outer end of the scale and hence make possible more accurate settings of the L-scale on the S-curve.

In the problem illustrated above, the choice of $L=0.02$ gave a sum of 100.62 for the $X_{Ls}$. Rather than make another trial, the true value of L may be determined by interpolation from the $L=0.1$ and the $L=0.02$ $X_L$ values:

$$\text{(Estimated) } L=0.1-\left(\frac{100-82.4}{100.6-82.4}\right)(0.1-0.02)$$

Upon solution of this equation L is found to be 0.023, and the true $X_{Ls}$ found by interpolation are as follows:

| Component | Trial $X_L$ |
|---|---|
| A | 4.04 |
| B | 6.08 |
| C | 4.52 |
| D | 37.13 |
| E | 48.23 |
| | 100.00 |

The difference in composition between the estimated (trial No. 3 for $L=.02$) and the true values is insignificant. The difference in the Ls ($L=.02$ by my slide rule and $L=0.023$ by interpolation) might be significant since it amounts to about 15% of the liquid residue. However, the precision of the slide rule is not adequate to determine the L any closer than that obtained. Further, the K (equilibrium vaporization) values used are never sufficiently accurate to justify more precise calculations. For instance, most generalized K-charts cannot be read with better precision than about ±2% of the K. A change in K from 0.098 to .102 for component E will vary the corresponding $X_L$ from 49.0 to 47.5, which variation is twice as great an uncertainty as that with which the rule can calculate the answers. In other words the precision of my slide rule is better than the K charts and therefore use of the slide rule will not introduce uncertainties in the results greater than those already present from other sources.

Using the interpolated values to complete the problem:

| Component | Composition of Residual Liquid, $X_L$ | Amount of Residual Liquid, Mols per Mols of feed | Feed (One Mole) | Residual Vapor, Mols per Mol of Feed | Composition of Residual vapor, Mol percent |
|---|---|---|---|---|---|
| A | 4.04 | .000929 | .40 | .399071 | 40.85 |
| B | 6.08 | .001514 | .30 | .298486 | 30.56 |
| C | 4.52 | .001040 | .05 | .048960 | 5.01 |
| D | 37.13 | .008640 | .19 | .181360 | 18.57 |
| E | 48.23 | .011093 | .06 | .048907 | 5.01 |
| | 100.00 | .023016 | 1.00 | .976784 | 100.00 |

The values of the "Amount of residual liquid" column were obtained by dividing the corresponding composition value in the "Composition of residual liquid, $X_L$" column by 100 and multiplying by 0.023. The sum of these products should then equal 0.023. These calculated products are subtracted from the respective amount of each component in one mole of feed to give the amount of each component in the "Residual vapor moles per mole of feed" column. The last column in the above tabulation gives the composition of the residual vapor as calculated from the quantities of the "individual components left in the vapor."

A check for mistakes and precision may be made by dividing the individual values in the residual vapor composition column by the corresponding $K_s$ and comparing with the $X_{Ls}$:

| Component | Y Residual Vapor Composition, Mole percent | K | Y/K | $X_L$ |
|---|---|---|---|---|
| A | 40.85 | 10 | 4.08 | 4.04 |
| B | 30.56 | 5 | 6.11 | 6.08 |
| C | 5.01 | 1.1 | 4.55 | 4.52 |
| D | 18.57 | .5 | 37.14 | 37.13 |
| E | 5.01 | .1 | 50.10 | 48.23 |

The disagreement between the above $Y/K$ value for component E and the corresponding $X_L$ value is mainly due to difficulty in reading the slide rule for small K values and in a possible slight variation in the value 0.023 which probably is not exactly 0.023000. However, the degree of precision is adequate for all ordinary cases.

The polar coordinate equation of the S-curves is:

$$\theta=\frac{360}{C}\log_{10}\left[1+(S-2)\left(\frac{r-a}{b}\right)+\left(\frac{r-a}{b}\right)^2\right]$$

wherein $S=K+L$, and $\theta$=degrees (using the $S$=1.0 line as zero degrees); $a$=distance between center and 1.0 graduation on L-scale; $b$=length of L-scale on indicator; $r$=distance from center; $C$=number of logarithmic cycles around the edge of the disk, three in this example.

Spaces between lines for constant K-values or S-values may preferably be subdivided so that no space between subdivisions shall be greater than 5 degrees of arc (with center at center of circle) nor smaller than about 1 degree of arc. The S-curves should preferably be continued as far as the $K$=0.01 or zero curve is continued, i. e., to the number 10 point on the U-scale.

While the above description is directed to the construction and use of a circular slide rule my invention is not to be limited to this type of slide rule although it is the preferred type. A straight or linear type of rule may be made embodying my invention.

Figure 4:
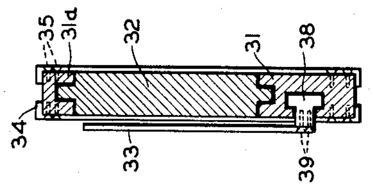
Figure 4 is a cross-sectional view of the embodiment of my calculator of Figure 3 and taken on the line 4—4 of Figure 3.
Figure 3:
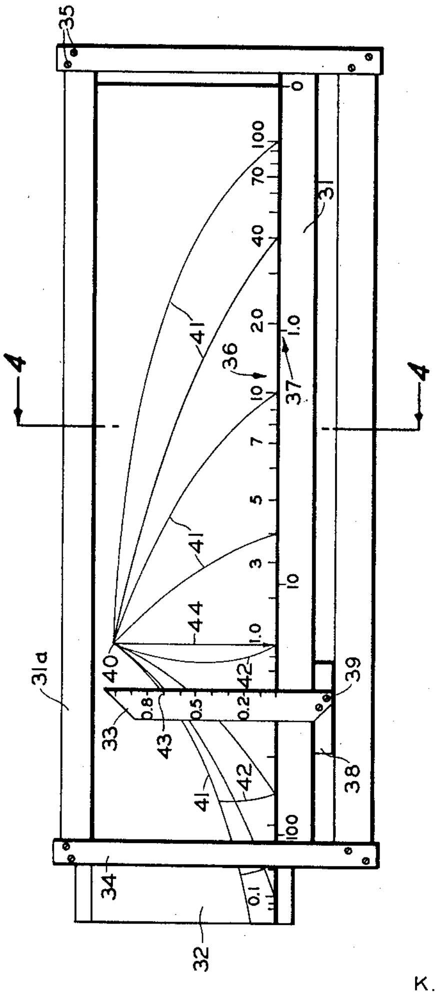
Figure 3 is a plan view of another embodiment of the calculator of my invention.

Figures 3 and 4 illustrate the construction of this type of rule. Reference numeral 31 refers to the lower body member and reference numeral 31a to an upper body member. These body members are provided with grooves to accommodate a movable slide 32. Another groove is provided in the lower body member to accommodate the small slide anchor 38. The indicator 33 may be fastened to the anchor 38 by some screws 39.

To this slide anchor is fastened, as by screws, an indicator or arm 33 which is provided with a liner scale 43. The upper and lower body members may be rigidly fastened together by braces 34 with the aid of screws 35. The lower body member 31 is provided with a 3-cycle logarithmic scale 37 while slide 32 is also provided with a 3-cycle logarithmic scale 36. Scales 36 and 37 are exactly the same length, are exactly identical, but reversed.

From scale point 1.0 on the slide scale 36 is drawn a straight line 44, as shown, which terminates at point 40.

K′ curves 41 are logarithmic cartesian coordinate curves plotted from the X and Y equations.

$$X=a\log_{10}[Y+K(1-Y)]$$

$$Y=L$$

"$a$" equals the length of the logarithmic cycle.

These K′ curves may also be plotted from value taken from the corresponding curves of Figure 1.

The S′ curves 42 are also logarithmic cartesian coordinate curves plotted on slide 32 with the point 40 as the origin and terminating at points along the scale 36 from 1.0 to 0.1 and may be constructed rfom the equations $$X=a\log_{10}[S-YS+Y^2]$$

$$Y=L$$

"$a$" equals the length of the logarithmic cycle.

This X equation is found by substituting the equivalent of K′, which is $(S'-L)$, for K in the above equation $X=L+K(1-L)$.

The S′ curves 42 may also be plotted on the slide 32 from points taken from the S-curves of Figures 1.

The operation of the rule of Figure 3 is substantially the same as for the circular rule of Figure 1. Simple multiplication and division operations are made using the scales 36 and 37, as with conventional slide rules.

To find the $X_L$ value, set the arrow (1.0) of the slide scale 36 opposite the concentration $X_a$ of component $a$ on scale 37, move the indicator 33 until the assumed value on the L-scale coincides with a K′-curve or an S′-curve for the component in question and read the answer on the logarithmic scale 37.

In the linear slide rule embodiment of my invention the S′-curves offer only slight advantage over use of K′-curves, and accordingly the S′-curves may be omitted.

My slide rule, that is, either embodiment, may be constructed of materials ordinarily used for constructing such instruments, that is, wood, aluminum, magnesium, Celluloid, or the like.

It will be obvious to those skilled in the art that many variations and alternations in the rules herein disclosed may be made, such as using 4 cycle log scales in place of 3 cycle scales when large K values are involved, or even using 2 cycle log scales when K values are not above 10, and yet remain within the intended spirit and scope of my invention.

Having disclosed my invention, I claim:

1. A slide rule for use in solving equations relating to equilibrium between two phases of a system consisting of a plurality of components comprising in combination a first member having a logarithmic scale and a series of curves thereon, said curves converging at a common point on said member and terminating at points on said scale, each curve of said series of curves being a function of the equilibrium K-constant, $K=y/x$, in which $y$ is the mol fraction of one component in a first phase and $x$ is the mol fraction of said component in a second phase, a second member slidable relative to the first member and having a second logarithmic scale inverted with respect to the first logarithmic scale, and a slide member having a linear scale disposed normal to said first and second scales and intersecting said curves and said second scale.

2. A slide rule for use in solving equations relating to equilibrium between two phases of a system consisting of a plurality of components comprising in combination a first member having a logarithmic scale and a first series of curves thereon, said curves converging at a common point on said first member and terminating at points on said scale, each curve of said series of curves being a function of the equilibrium K-constant, $K=y/x$, in which $y$ is the mol fraction of one component in a first phase and $x$ is the mol fraction of said component in a second phase, a second series of curves thereon, each curve of said second series of curves also terminating at points on said scale and being a second function of said equilibrium K-constant of said component, a second member slidable relative to the first member and having a second logarithmic scale inverted with respect to the first logarithmic scale, and a slide member having a linear scale disposed normal to said first and second scales and intersecting said curves and said second scale.

3. A circular slide rule for use in solving equations relating to equilibrium between two phases of a system consisting of a plurality of components comprising in combination a first circular member having a logarithmic scale and a series of curves thereon, said curves converging at a common point on said member and terminating at points on said scale, each curve of said series of curves being a function of the equilibrium K-constant, $K=y/x$, in which $y$ is the mol fraction of one component in a first phase and $x$ is the mol fraction of said component in a second phase, a second circular member rotatable relative to the first circular member and having a second logarithmic scale inverted with respect to the first logarithmic scale, and a slide member having a linear scale disposed normal to said first and second scales and intersecting said curves and said second scale, said points of said intersection defining a straight line passing through the center of rotation of said slide member.

4. A circular slide rule for use in solving equations relating to equilibrium between two phases of a system consisting of a plurality of components comprising in combination a first circular member having a logarithmic scale disposed around the periphery thereof and a series of curves thereon, said curves converging at a common point on said member and terminating at points on said scale, each curve of said series of curves being a function of the equilibrium K-constant, $K=y/x$, in which $y$ is the mol fraction of one component in a first phase and $x$ is the mol fraction of said component in a second phase, a second circular member rotatable relative to the first circular member and having a second logarithmic scale disposed adjacent said first logarithmic scale, said first logarithmic scale disposed inverted with respect to said second logarithmic scale, and a slide member having a linear scale disposed normal to said first and second scales and intersecting said curves and said second scale, said points of said intersection defining a straight line passing through the center of rotation of said slide member.

5. The circular slide rule of claim 4 wherein the logarithmic scales are 3-cycle scales.

6. The circular slide rule of claim 4 wherein each curve of said series of curves is defined by the equation $$\theta=\frac{360}{C}\log\left[1+\frac{k(r-a)}{b}\right]$$

in which $\theta$=degrees using the $K=1$ line as zero degrees, $a$=distance between the center and a 1.0 graduation on said linear scale, $b$=the length of said linear scale, $k=(K-1)$, $r$=distance from the center and $C$=the number of logarithmic cycles of said logarithmic scales.

7. A circular slide rule for use in solving equations relating to vaporization equilibrium between two phases of a system consisting of a plurality of components comprising in combination a first circular member having a logarithmic scale disposed around the periphery thereof, and a first series of curves thereon, said curves converging at a common point on said member and terminating at points on said scale, each curve of said series of curves being a function of the equilibrium vaporization K-constant, $K=y/x$, in which $y$ is the mol fraction of one component in the vapor state and $x$ is the mol fraction of said component in the liquid state, and a second series of curves thereon, said curves of said second series of curves also terminating at points on said scale and being second functions of said K-constant of said component, a second circular member rotatable relative to the first circular member and having a second logarithmic scale disposed adjacent said first logarithmic scale and inverted with respect thereto, and a slide member having a linear scale disposed normal to said first and second scales and intersecting said curves and said second scale, said points of said intersection defining a straight line passing through the center or rotation of said slide member.

8. The circular slide rule of claim 7 wherein each curve of said first series of curves is defined by the equation $$\theta=\frac{360}{C}\log\left[1+\frac{k(r-a)}{b}\right]$$

in which $\theta$=degrees using the $K=1$ line as zero degrees, $a$=distance between the center and a 1.0 graduation on said linear scale, $k=(K-1)$, $r$=distance from the center and C=the number of logarithmic cycles comprising first said logarithmic scale, and each curve of said second series of curves is defined by the equation $$\theta=\frac{360}{C}\log\left[1+(S-2)\left(\frac{r-a}{b}\right)+\left(\frac{r-a}{b}\right)^2\right]$$

in which $\theta$=degrees using the $K=1$ line as zero degrees, $a$=distance between the center and a 1.0 graduation on said linear scale, $r$=distance from the center, C=the number of logarithmic cycles comprising first said logarithmic scale, and $S=K+L$ in which K is the equilibrium vaporization constant of said one of said components and L is a numerical value from said linear scale.

9. A linear slide rule for use in solving equations relating to equilibrium vaporization of a system consisting of a plurality of components comprising in combination a first linear member having a logarithmic scale and a series of curves thereon, said curves converging at a common point on said first linear member and terminating at points on said scale, each curve of said series of curves being a function of the equilibrium vaporization K-constant, $K=y/x$, in which $y$ is the mol fraction of one component in the vapor state and $x$ is the mol fraction of said component in the liquid state, a second linear member slidable relative to the first and having a second logarithmic scale inverted with respect to the first logarithmic scale, and a slide member having a linear scale disposed normal to said logarithmic scales and intersecting said curves and said second scale.

10. The linear slide rule of claim 9 in which the two logarithmic scales are 3-cycle scales and the curves of said first series of curves are defined by the equations $$X=a\log_{10}[Y+K(1-Y)]$$

and $$Y=L$$

and the curves of said second series of curves are defined by the equations $$X=a\log_{10}[S'-YS'+Y^2]$$

and $$Y=L$$

11. A linear slide rule for use in solving equations relating to equilibrium between two phases of a system consisting of a plurality of components comprising in combination a first linear member having a logarithmic scale and a series of curves thereon, said curves converging at a common point on said first linear member and terminating at points on said scale, each curve of said series of curves being a function of the equilibrium K-constant, $K=y/x$, in which $y$ is the mol fraction of one component in a first phase and $x$ is the mol fraction of said component in a second phase, and a second series of curves thereon, said curves of said second series of curves also terminating at a point on said scale, each curve of said second series of curves being a function of the equilibrium S-constant, $S=K+L$, in which K is the above mentioned K-constant and L is a numerical value from a slide member having a linear scale normal to said logarithmic scale as subsequently mentioned, a second linear member slidable relative to the first and having a second logarithmic scale thereon and inverted with respect to the first logarithmic scale, and a slide member having a linear scale disposed normal to said logarithmic scales and intersecting some of said curves and said second scale.

12. The linear slide rule of claim 11 in which the curves of said first series of curves are defiined by the equations $$X=a \log_{10} [Y+K(1-Y)]$$

and $$Y=L$$

and the curves of said second series of curves are defined by the equations $$X=a \log_{10} [S'-YS'+Y^2]$$

and $$Y=L$$

KARL H. HACHMUTH.

REFERENCES CITED

The following references are of record in the file of this patent:

UNITED STATES PATENTS

| Number | Name | Date |
|---|---|---|
| 1,157,609 | Backstrand et al. | Oct. 19, 1915 |
| 2,443,882 | Allen | June 22, 1948 |

FOREIGN PATENTS

| Number | Country | Date |
|---|---|---|
| 292,223 | Great Britain | June 14, 1928 |
| 359,573 | Italy | Mar. 10, 1938 |

OTHER REFERENCES

"Petroleum Refinery Engineering," by W. L. Nelson, p. 230, published by McGraw-Hill Book Co., Inc., N. Y., 1941.